May 17, 1966   G. GUSTIN   3,251,242

CAMS AND SUPPORTS THEREOF

Filed Sept. 5, 1963   2 Sheets-Sheet 1

Inventor
GIULIANO GUSTIN

By Irwin S. Thompson
Attorney

May 17, 1966   G. GUSTIN   3,251,242
CAMS AND SUPPORTS THEREOF
Filed Sept. 5, 1963   2 Sheets-Sheet 2

Inventor
GIULIANO GUSTIN
By Irwin S. Thompson
Attorney

United States Patent Office 3,251,242
Patented May 17, 1966

3,251,242
CAMS AND SUPPORTS THEREOF
Giuliano Gustin, Milan, Italy, assignor to Soc. per Azioni Fratelli Borletti, Milan, Italy
Filed Sept. 5, 1963, Ser. No. 306,942
Claims priority, application Italy, Sept. 5, 1962, 17,668/62
7 Claims. (Cl. 74—568)

This invention relates to cams having a profile which can be modified, particularly for the control of the cyclic movements of sewing machines, and to supports for the said cams, particularly adapted to render the mounting and dismantling of the said cam simple and practical.

A cam according to the present invention comprises at least two circular sectors which are independently interchangeable on a support, each sector being provided with means for independently locking it on the support, the said means ensuring the correct radial position and timing of the cam arrangement.

The said support comprises a hub which is fast at its end with a disc having substantially the same diameter as the cam and associated with means by which movement can be imparted thereto, the cam engaging on the said hub, the said cam being successively secured by means of a locking disc and the said locking means of the cam sectors, so as to prevent any undesirable sliding or rotation thereof on the hub.

In a preferred embodiment of the invention, the said means for imparting movement consist of a toothed wheel also having a diameter corresponding substantially to that of the cam; a toothed control wheel can thus engage the cam assembly peripherally, permitting the use of cam assemblies of different diameters which nevertheless rotate at a uniform peripheral velocity.

The fact that it is possible to have available a plurality of interchangeable sectors, this arrangement being precisely equivalent to a cam the profile of which can be modified, notably increases (as will be readily appreciated) the number of profiles which can be utilized, even with a relatively small number of available sectors. On the other hand, the importance of the support resides esssentially in its constructional simplicity, due to which it becomes possible even for an unskilled person to rapidly and easily mount and remove the interchangeable cams.

The invention will now be described with reference to the accompanying drawings, in which.

Figure 1:
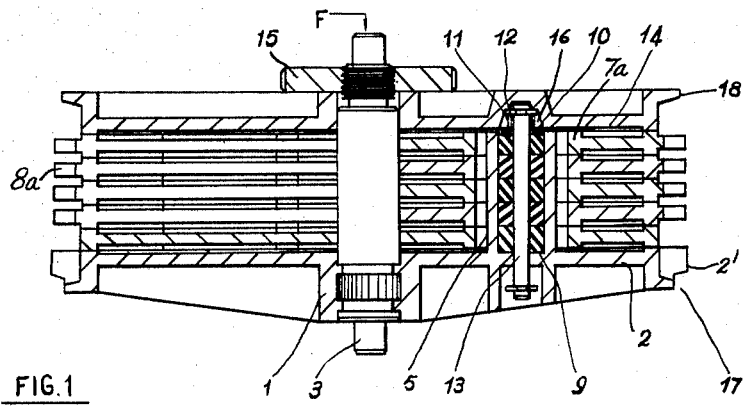
FIG. 1 is an axial section through a support in one embodiment of the invention, taken on the line 1—1 of FIG. 2, driven by a toothed wheel the diameter of which corresponds to that of the cams.
Figure 2:
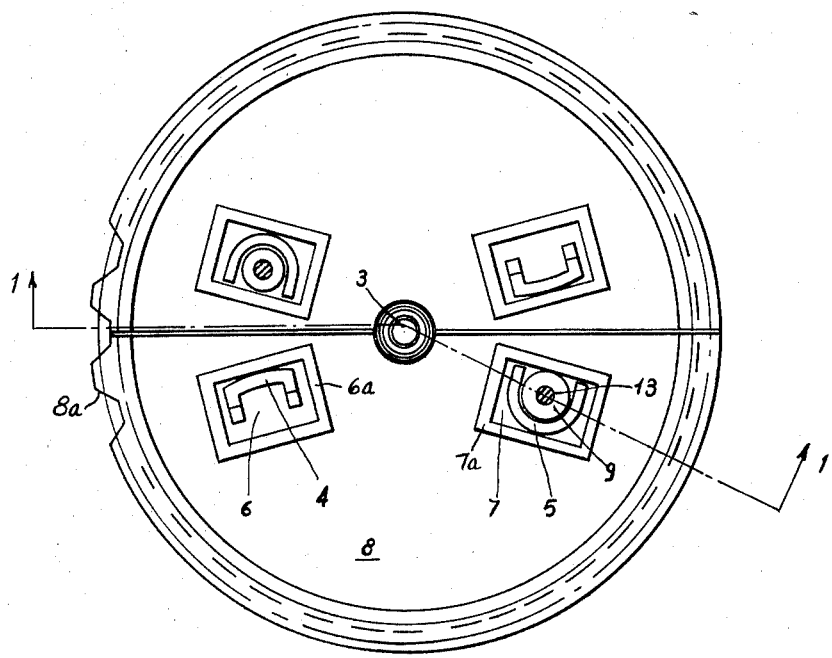
FIG. 2 is a view, in the direction of the arrow F of FIG. 1, of the support without its locking disc and showing a cam in two sectors.

Referring to FIGS. 1 and 2, the cam support comprises a hub 1 with which is associated a disc 2 having a toothed wheel 2'; keyed within the hub 1 is a pin 3. From the plane of the disc 2 project perpendicularly posts 4 and 5 on which engage apertures 6 and 7 respectively of the sectors of the cam 8. Apertures 6 and 7 are bordered by marginal reinforcing frames 6a and 7a, respectively. In order to lock the sectors, at least one of the posts is provided with expansion means; in the embodiment illustrated, there are associated with the post 5 flexible rubber rings 9 which, when they expand, act on the edge of the aperture 7 in such manner as to produce the anti-clockwise rotation of the sector 8 until the aperture 6 is displaced into contact with the post 4 so as to lock the said sector. The contact between the aperture 6 and the post 4 effects the timing of the sector whereas the contact of the radially inner portion of the cam sector with the pin 3 provides for radial positioning. The expansion of the rings 9 is produced by means of a washer 10 on which acts a pressure spring 11 disposed between the washer 10 and a washer 12 fixed relative to a pin 13. Each sector 8 has external cam surfaces 8a thereon.

A locking disc 14 is locked, by means of a nut 15, on the cam sectors 8, in such manner as to lock them. The locking disc 14 is formed with a recess 16 within which engages the upper end of the pin 13; when the disc is locked on the cams by means of the nut 15, it presses on the said pin, depressing it and in this way bringing about, through the action of the spring 11, the expansion of the said rings 9. Associated respectively with the disc 2 and the disc 14 are circular cylindrical faces 17 and 18 having axes coinciding with the axis of the pin 3 and representing substantially the base profile of the cams, that is, the circular contour of the cam when the cam is in an idle or nonactuating position.

Figure 3:
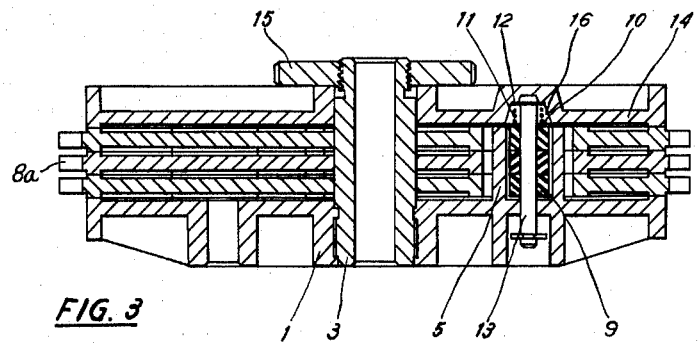
FIG. 3 is a view corresponding to that of FIG. 1 of a support driven at the hub pin.

In the embodiment of the invention illustrated in FIG. 3, the pin 3 is hollow; it is intended to receive the prolongation of a control shaft (not shown).

The coupling between the said control shaft and the hollow pin 3 can be effected for example by making the cavity in the pin 3 of square sectors.

Figure 4:
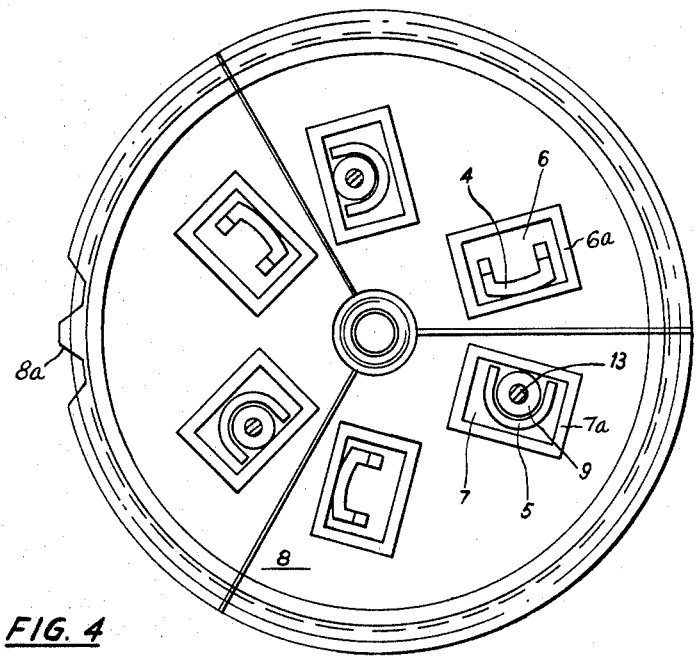
FIG. 4 is a view, corresponding to FIG. 2 of an arrangement utilizing interchangeable cams formed from three sectors.

FIG. 4 shows a cam in three sectors, each having preferably a 120° angular extent and with each of which is associated a pair of posts 4 and 5 entirely similar to those described with reference to the preceding embodiment.

As already stated, the importance of the provision of a cam comprising a plurality of sectors (especially if the diameter is sufficiently large) is the possibility of having available an extremely wide range of profiles by making up various combinations of a relatively limited number of sectors.

What I claim is:

1. A cam for controlling the movements of sewing machines, comprising a rotatable supporting disc, at least one series of sectors, all said sectors having external cam surfaces and having substantially the same angular extent and circular base profiles of the same radius and concentric with said supporting disc, the total angular extent of the said series of sectors comprising 360° thereby to form a complete cam, and means for independently and replaceably mounting each said sector on said disc, the equal angular extent and the concentric circular base profiles of said sectors permitting said sectors to be assembled and reassembled in a large number of different combinations.

2. A cam as claimed in claim 1, said mounting means comprising pairs of posts carried by the disc and extending away from the disc, one said pairs of posts being disposed within each of said sectors.

3. A cam as claimed in claim 2, and expansible means associated with one of said posts of each said pair of posts for locking the associated sector in an angularly adjusted position.

4. A cam as claimed in claim 3, in which said expansible means comprises elastic deformable ring means associated with said one post, and means for exerting pressure on said ring means to expand it.

5. A cam as claimed in claim 1, and a locking disc on the side of said sectors opposite said rotatable disc, and a pin axially interconnecting said locking disc and said rotatable disc.

6. A cam as claimed in claim 5, said rotatable disc and said locking disc having cylindrical surfaces coaxial with said pin, said cylindrical surfaces corresponding to the base profile of said sectors, one of said discs having driven gear teeth thereon for rotating said cam.

7. A cam as claimed in claim 1, and a locking disc on the side of said rotatable disc opposite said sectors, a pin fixed to said rotatable disc and extending past said sectors and through said locking disc and terminating in a screw-threaded end, and a nut on said screw-threaded end of the pin for retaining said locking disc in position on said cam.

References Cited by the Examiner
UNITED STATES PATENTS

| | | | |
|---|---|---|---|
| 1,495,945 | 5/1924 | Wyatt | 74—568 |
| 2,281,468 | 4/1942 | Van Lammeren | 74—568 |
| 2,308,963 | 1/1943 | Davis et al. | 74—568 |
| 2,969,693 | 1/1961 | Immel | 74—568 |

MILTON KAUFMAN, *Primary Examiner.*
BROUGHTON G. DURHAM, *Examiner.*
W. S. RATLIFF, *Assistant Examiner.*